(No Model.)
W. H. BENNETT.
SAW MILL DOG.
No. 426,520. Patented Apr. 29, 1890.
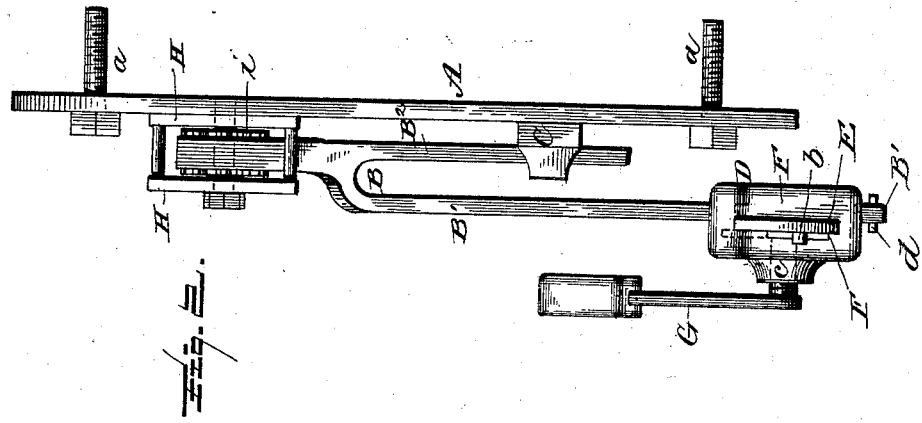
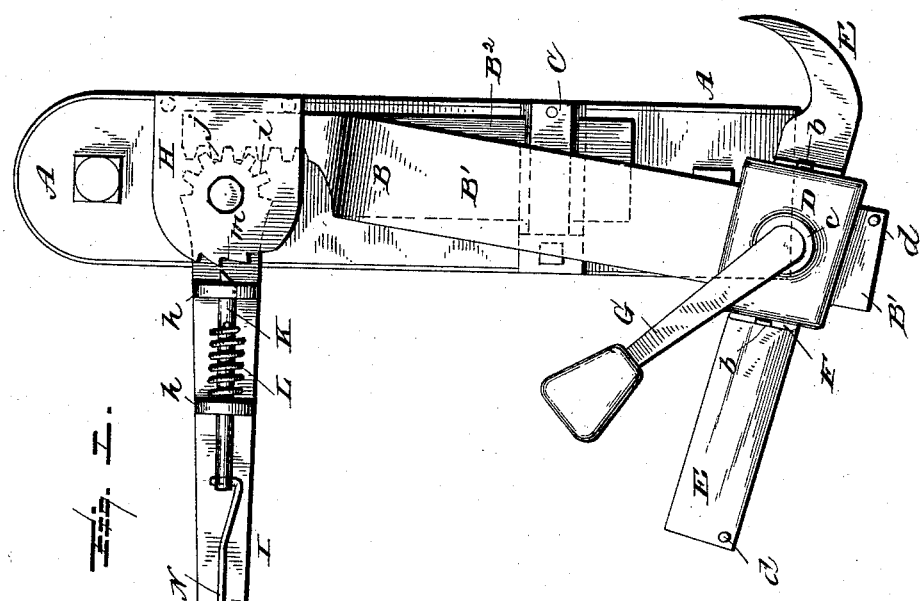
WITNESSES:
L. C. Hill
E. H. Bond
INVENTOR
William H. Bennett
BY
Chas. H. Fowler
ATTORNEY.

UNITED STATES PATENT OFFICE.

WILLIAM H. BENNETT, OF KOKOMO, INDIANA.

SAW-MILL DOG.

SPECIFICATION forming part of Letters Patent No. 426,520, dated April 29, 1890.

Application filed January 6, 1890. Serial No. 336,054. (No model.)

*To all whom it may concern:*

Be it known that I, WILLIAM H. BENNETT, a citizen of the United States, residing at Kokomo, in the county of Howard and State of Indiana, have invented certain new and useful Improvements in Saw-Mill Dogs; and I do hereby declare that the following is a full, clear, and exact description of the same, reference being had to the annexed drawings, making a part of this specification, and to the letters of reference marked thereon.

This invention relates to certain new and useful improvements in saw-mill dogs; and it has for its object, among others, to provide an improved device of this character which shall be cheap and strong, simple in its construction, adapted for use with logs that are crooked or knotty near the end, avoiding the necessity of making holes in the dog proper, and having provision for non-interference with the setting-rod of the head-blocks.

The novelty resides in the peculiar combinations and the construction, arrangement, and adaptation of parts, all as more fully hereinafter described, shown in the drawings, and then particularly pointed out in the appended claims.

The invention is clearly illustrated in the accompanying drawings, which, with the letters of reference marked thereon, form a part of this specification, and in which—

Figure 1 is a side elevation illustrating my improvement. Fig. 2 is an edge view of the same.

Referring now to the details of the drawings by letter, A designates a plate which serves to attach the parts to the knee of the head-block used on all saw-mills. This plate may be attached by means of screws $a$, or otherwise, as may be found most desirable.

B is a casting, comprising the main arm B' and the guide-arm B² in one piece, the two being arranged at an angle, as shown best in Fig. 1, the main arm B' being inclined from the other, so as not to interfere with the rod connecting the setting-gear of the head-blocks on which the log or planks rest while being sawed. The end of the guide-arm is held in the guide C, attached to the plate A, and the free end of the main arm B' carries a sliding head D, through an opening in which the dog E is passed with its face in contact with the said arm, as shown in Fig. 2. On the top of the dog there is a thin plate of spring-steel F, extending the full width of the dog and having lips $b$ on each end to prevent its being accidentally displaced. On this head near its center there is a raised projection or boss $c$, in which is cut a screw-thread, in which works the screw-threaded end of the lever G, which end bears against the steel plate F, so that by turning upon the screw of the lever the said plate will be forced against the dog and the latter pressed firmly against the plate A and there held. Importance is attached to the presence of this plate F, as by its use no holes or depressions are made in the dog, and it can always be readily adjusted nicely in position, which is very important when the dog is being used to hold a plank or thin piece while being sawed. This plate forms a friction device, which serves effectually to hold the dog from slipping.

Pins or stops $d$ are provided in the end of the main arm, as well as in the end of the shank of the dog, to prevent displacement and loss thereof.

On the plate A are ears H, between which, on a suitable pivot $h$, is pivoted a lever I, provided with cogs $i$, which are designed to engage with cogs $j$ on the upper end of the casting B, as shown clearly in Fig. 1. This lever is provided with a suitable handle and is formed with lugs $h$, in openings in which works the bolt K, provided with a coiled spring L, arranged between the said lugs, as shown in Fig. 1, and at its free end this bolt is formed into a pawl adapted to engage notches $m$ on the ears or boxing of the plate A, in which the said lever is pivoted. On the lever I is pivoted a smaller lever M, and this smaller lever is pivotally connected with the bolt by means of a link or rod N, as shown in Fig. 1.

The operation is simple and apparent. The dog is secured in its proper position by means of its operating-lever G, and the dog is then forced into the log by means of the lever I and its connections, as above described. The lever M being in the same plane as the lever I when the latter is grasped to operate the dog, the smaller lever is also grasped, thus pulling the bolt out of contact with the notches and allowing the parts to be operated. When the lever I is dropped, after the parts are adjusted, the spring around the bolt forces it into engagement with the notch and holds the parts in their adjusted position.

What I claim as new is—

1. The combination, with the attaching-plate and the casting, of the sliding head, the dog therein, the spring-plate bearing on the dog and having lips, as set forth, and the screw-threaded lever tapped through the head and bearing on the spring-plate, as set forth.

2. The combination, with the attaching-plate, the casting, the dog carried thereby, the casting being provided with cogs, as shown, of the lever fulcrumed on the said plate and having cogs engaging those of the casting, and means for holding the lever in its adjusted position, as set forth.

In testimony that I claim the above I have hereunto subscribed my name in the presence of two witnesses.

WILLIAM H. BENNETT.

Witnesses:
JAMES M. BROWN,
NOTT N. ANTRIM.